United States Patent [19]
Carlin et al.

[11] 3,822,412
[45] July 2, 1974

[54] WAVEGUIDE EXPANSION JOINT

[75] Inventors: James Walter Carlin, Branchburg Township, Somerset County; Roger Joseph Colardeau, Florham Park, both of N.J.

[73] Assignee: Bell Telephone Laboratories, Incorporated, Murray Hill, N.J.

[22] Filed: June 11, 1973

[21] Appl. No.: 368,618

[52] U.S. Cl. ............... 333/98 R, 285/301, 285/302
[51] Int. Cl. ......................... H01p 1/06, F16l 27/12
[58] Field of Search ............. 333/98 R, 97 R, 95 A; 285/165, 301, 302, 328

[56] References Cited
UNITED STATES PATENTS

| | | | |
|---|---|---|---|
| 485,729 | 11/1892 | Wright | 285/328 |
| 2,571,021 | 10/1951 | Early | 333/95 A |
| 2,751,561 | 6/1956 | King | 333/98 R |
| 2,848,695 | 8/1958 | Pierce | 333/95 R |
| 3,572,776 | 3/1971 | Herd et al. | 285/302 |
| 3,764,168 | 10/1973 | Kisling et al. | 285/302 |

FOREIGN PATENTS OR APPLICATIONS

| | | | |
|---|---|---|---|
| 2,007 | 1896 | Great Britain | 285/165 |
| 910,174 | 1954 | Germany | 333/95 A |

*Primary Examiner*—James W. Lawrence
*Assistant Examiner*—Wm. H. Punter
*Attorney, Agent, or Firm*—A. D. Hooper

[57] ABSTRACT

An expansion joint for a waveguide line comprises two telescoping tubular members and a bellows connecting the two members to allow relative movement therebetween while maintaining a uniform continuous electrical surface through the joint with the capability of supporting either positive or negative pressure with respect to atmospheric pressure.

9 Claims, 5 Drawing Figures

WAVEGUIDE EXPANSION JOINT

BACKGROUND OF THE INVENTION

1. Field of the Invention

This invention relates to millimeter waveguide transmission systems utilizing low loss circular electric modes, and more particularly to an expansion joint for joining sections of such systems.

2. Description of the Prior Art

Waveguide systems utilizing rigid discrete supports for supporting rigid circular waveguide sections within a surrounding conduit require the use of expansion joints to accommodate expansions and contractions of the sections because of temperature changes. Even waveguide systems utilizing compliant continuous supports which may eliminate the necessity of expansion joints between the rigid waveguide sections will probably still require such joints for connecting the sections to the very sensitive repeaters used in such systems.

One presently known expansion joint utilizes mating tapered sleeves having a slip fit to join the waveguide sections. This type of joint presents discontinuities or step junctions to the transmitted signals thereby degrading the signals by generating spurious modes.

Another type of presently known expansion joint utilizes a properly configured dielectric member to transfer the signals across the joint in a trapped mode. Such an expansion joint is relatively more complex than desired.

Another disadvantage of the presently known expansion joints is the requirement for relatively complex arrangements for maintaining hermetic or pressure seals across the joints.

Accordingly, it is an object of this invention to improve expansion joints for waveguide systems to reduce the signal degradation caused thereby.

Another object is to simplify expansion joints for circular waveguide systems.

SUMMARY OF THE INVENTION

An expansion joint for joining sections of waveguide in accordance with the foregoing objectives comprises a second tubular member mounted in a telescoping relationship in a first tubular member. A bellows is mounted in a partially compressed initial condition around the inner surface of the first member and has one end fastened in a pressure tight joint such as a weld to the first member flush with the face thereof and the second end forming a pressure tight sleeve joint with the second member. The bellows has a configuration such that the inner and outer diameters or radii thereof remain constant during compression and expansion from the initial condition thereby presenting a substantially uniform continuous electrical surface to signals being transmitted therethrough.

BRIEF DESCRIPTION OF THE DRAWING

The invention will be more fully comprehended from the following detailed description and accompanying drawing in which.

DETAILED DESCRIPTION

Figure 1:
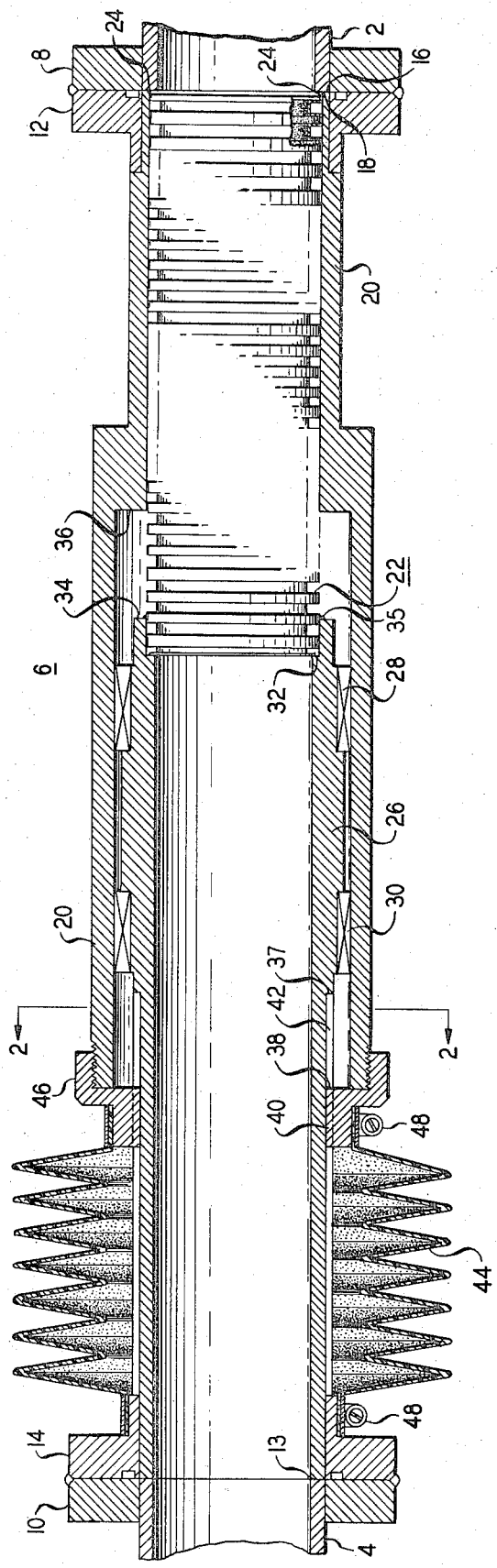
FIG. 1 is a longitudinal partly sectional representation of an expansion joint in accordance with this invention.

Referring now to FIG. 1, waveguide sections 2 and 4 are joined by an expansion joint generally referred to as 6 in accordance with this invention. Waveguide sections 2 and 4 have respective flanges 8 and 10 thereon which are connected to respective mating flanges 12 and 14 on joint 6 by techniques known in the art such as by welding, bolting, et cetera. For example, as disclosed in the copending application Ser. No. 245,822 filed by H. A. Baxter et al. on Apr. 20, 1972, issued on Sept. 25, 1973 as U.S. Pat. No. 3,761,005, and assigned to the assignee of this invention, it is possible to very accurately align and join by welding mating flanges such as 8 and 12 so that the end 16 of waveguide section 2 is very accurately registered with the end 18 of joint 6 thereby presenting no discontinuities which would cause degradation of the transmitted signal.

Waveguide sections 2 and 4 will undergo expansions and contractions in their axial direction as a result of temperature fluctuations of the surrounding environment. These expansions and contractions are accommodated by expansions and compressions of joint 6 as will now be discussed in detail.

Joint 6 comprises a first tubular member or sleeve 20 rigidly connected to waveguide section 2 at flanges 8 and 12 as previously described. Mounted around the inner wall surface of member 20 in a partially compressed initial state is a bellows 22 having an effective electrical diameter equal to that of waveguide 2, i.e., the diameter of bellows 22 appears the same as the inner diameter of member 2 to a signal being transmitted therethrough. Bellows 22 advantageously can be fastened to member 20 by electron beam weld 24 so that the end of bellows 22 is flush with the face of flange 12 and mates with waveguide 2 without presenting degrading discontinuities to the signal being transmitted. The welded joint provides a pressure tight seal which allows the interior of joint 6 and waveguide section 2 to be maintained either above or below atmospheric pressure. The inner wall surface of member 20 constrains the movement of bellows 22 to axial expansion and compression from the initial state in this embodiment. Bellows 22 will be discussed in more detail subsequently.

A second tubular member 26 is inserted within member 20 and mounted therein on appropriate bearings 28 and 30 known in the art so that it can move in a telescoping relationship with respect to member 20. Member 26 is rigidly connected to waveguide 4 at flanges 10 and 14 as previously explained. The effective electrical diameter of member 26 equals the electrical diameter of waveguide 4, i.e., the inner diameter of member 26 equals the inner diameter of waveguide 4 so that no degrading discontinuities appear at the junction 13 of these two members when they are properly aligned and joined as previously explained.

Along the inner wall surface and adjacent end 34 thereof, member 26 has a step or flange 32 against which bellows 22 abuts to form a butt joint. Bellows 22 advantageously can be welded or bonded to member 26 at end 34 by weld 35 to form a pressure tight joint. The effective electrical diameter of bellows 22 is matched with the electrical diameter of member 26 so that no degradation in the transmitted signal is caused by the joint therebetween at flange 32.

When waveguide sections 2 and 4 expand, member 26 can telescope within member 20 thereby compressing bellows 22 from its initial state until the end 34 of member 26 abuts the flange or step 36 on member 20. The amount of allowable compression can readily be selected by proper dimensioning of the parts to accommodate the greatest expected expansion of the adjacent waveguide sections. Likewise upon contraction of waveguide sections 2 and 4, member 26 can move outward until flange 37 on member 26 abuts portion 38 of flange 46 thereby accommodating the contraction of the waveguide sections.

Figure 2:
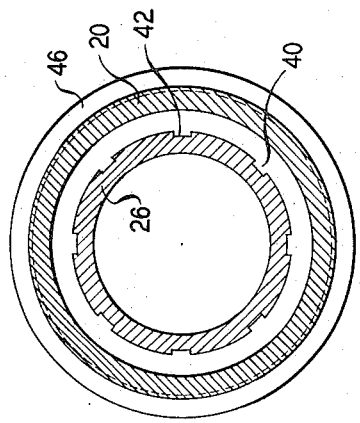
FIG. 2 is a view along direction 2—2 of FIG. 1.

In order to prevent rotation of member 26 with respect to member 20 during relative axial movement thereof, a spline arrangement as shown more fully in FIG. 2 can be used. Portion 38 of flange 46 which is rigidly mounted on member 20 has a plurality of splines or teeth 40 which extend into mating grooves 42 on member 26 thereby preventing rotation of member 26 within member 20.

A protective cover 44 advantageously can be attached over the telescoping portion of member 26 to prevent the ingress of dirt and other contaminants through grooves 42 into bearings 28 and 30 and eventually into the interior of joint 6. Cover 44 can be fastened to flange 14 and flange 46 on the end of member 20 by appropriate hardware 48 such as hose clamps. Cover 44 can comprise a plastic bellows or other flexible device known in the art.

Figure 3:
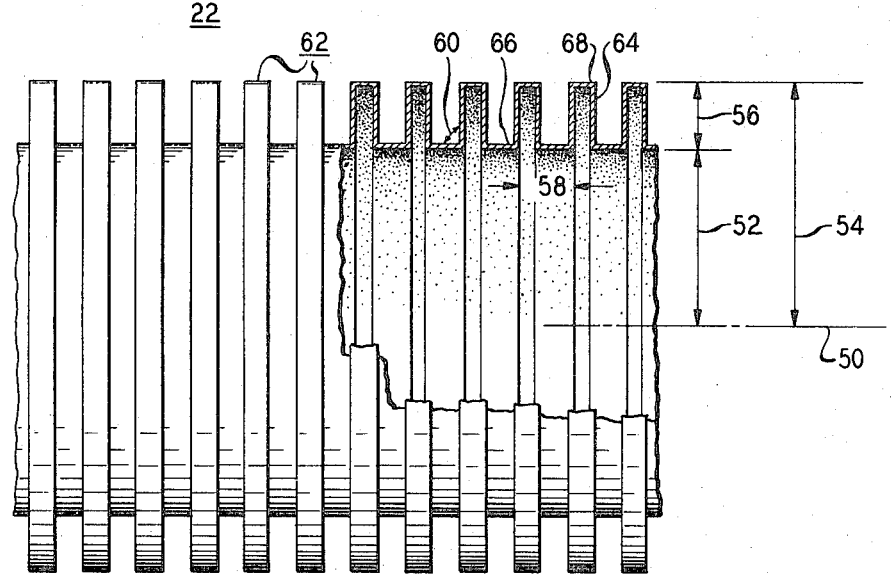
FIG. 3 is an enlarged partly sectional view of a bellows utilized in the joint of FIG. 1.

As previously mentioned in order to prevent degrading discontinuities the effective electrical diameter or radius of bellows 22 must be matched with the electrical diameters or radii of waveguide section 2 and member 26 on the respective ends thereof. To maintain this match, the electrical diameter of bellows 22 must remain essentially constant during expansion and compression. A bellows having this characteristic will now be discussed with reference to FIG. 3.

The effective electrical diameter which bellows 22 presents to a signal being transmitted therethrough depends upon such parameters as its inner and outer radii 52 and 54, respectively, the height 56 of the convolutions 62, the pitch or spacing 58 of convolutions 62 and the angle 60 of these convolutions 62. In general, in order to maintain a constant electrical diameter during relative expansion and compression, the inner and outer radii 52 and 54, respectively must remain essentially constant. When bellows 22 is in its relaxed or unstressed condition, the fins or sections 64 of convolution 62 joining the inner and outer concentric cylindrical sections 66 and 68, respectively, are essentially planar and angle 60 is slightly greater than 90°. However, as previously indicated, bellows 22 is advantageously installed in a partially compressed initial condition so that bellows 22 always operates in a compression mode. For example, bellows 22 could be installed at the expected ambient temperature in a 50 percent initially compressed condition. Thereafter bellows 22 would accommodate subsequent expansion of the waveguide line by further compression in the range of 50–100 percent of its allowable compression and would accommodate contractions of the waveguide line by reducing its compression to the range of 50–0 percent of the allowable compression.

When bellows 22 is compressed from its unstressed condition, including the initial compression on installation fins or sections 64 dimple and are distorted within the elastic limit out of their planar configuration thereby permitting relative axial movement of sections 66 and 68 with respect to each other. However, sections 66 and 68 remain parallel with each other and with the axis 50 of the expansion joint during this compression and the inner and outer radii 52 and 54, respectively, remain constant. Accordingly, the electrical radius (or diameter) of the bellows 22, which may equal the average radius (or diameter), remains constant.

Figure 4:
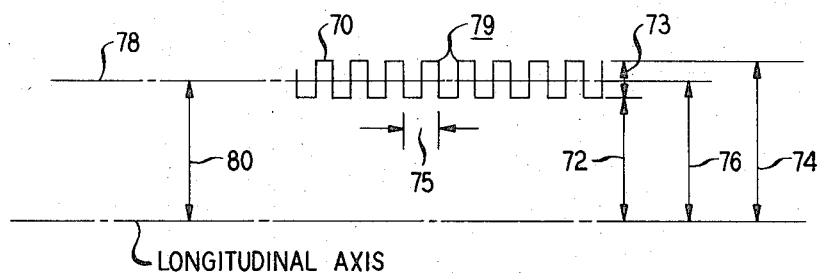
FIG. 4 is a schematic sectional representation of one embodiment of the bellows of FIG. 3.

The effective electrical diameter of bellows 22 is not necessarily the same as the average diameter mentioned above depending upon the values selected for the other parameters of bellows 22. The registration of bellows 22 with respect to the ends of the adjacent waveguide sections and tubular members will depend on the electrical diameter of bellows 22 since this diameter must match the diameter of the mating waveguide section or tubular member. FIG. 4 is a schematic sectional representation of the coupling of a bellows 70 having an electrical radius 76 equal to the average of inner and outer radii 72 and 74, respectively, with a waveguide 78 having an inner radius 80 equal to electrical radius 76, i.e., the inner surface of waveguide 78 is aligned with average radius 76. Waveguide 78 connects to bellows 70 so that an effectively continuous electrical surface having a radius 76 is presented across the junction of waveguide 78 and bellows 70. Bellows 70 would be similarly coupled on the other end to another waveguide section or to the telescoping tubular member within the expansion joint. In the bellows of FIG. 4 the following ranges apply to the controlling parameters in order to obtain the indicated electrical diameter:

$$[r/R < 0.01]; [r \approx p]; [p \leqslant \lambda/4],$$

where
 $r$ is ½ (radius 74 − radius 72), i.e., is one-half the height 73 of a convolution 79;
 $R$ is radius 76;
 $p$ is the pitch or spacing 75 of convolutions 79; and
 $\lambda$ is the wavelength of the highest frequency being transmitted through the waveguide.

Figure 5:
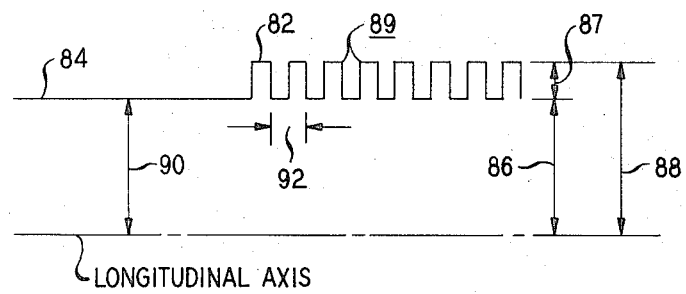
FIG. 5 is a schematic sectional representation of a second embodiment of the bellows of FIG. 3.

A schematic representation of a bellows 82 having a different effective electrical radius is shown in FIG. 5. In this embodiment the effective electrical radius of bellows 82 equals inner radius 86. Hence the inner radius 90 of the mating waveguide 84 is made equal to radius 86 so that an effectively continuous electrical surface having a radius 86 is presented to the signal. The following ranges apply to the parameters of bellows 82:

$$[p \leqslant \lambda/4]\,; \,]r >> p],$$

where
 $r$ is ½ (radius 88 − radius 86), i.e., is one-half the height 87 of a convolution 89;
 $p$ is the pitch or spacing 92 of a convolution 89; and
 $\lambda$ is the wavelength of the highest frequency being transmitted.

When $p$ approximately equals $\lambda/4$, the bellows of FIG. 5 breaks the phase velocity degeneracy between the $TE_{01}$ mode and the spurious $TM_{11}$ mode and thus advantageously could be used as flexible waveguide and in route bends as well as in expansion joints. In the flexible waveguide and route bend applications tubular members 20 and 26 would have to be modified to allow bending and offsetting of the bellows as contrasted with the discussed expansion joint application where the bellows is constrained by members 20 and 26 to axial expansions and compressions from the initial condition.

It should be apparent from the foregoing that the expansion joint of this invention can be dimensioned to accommodate any expected expansion and contraction in the waveguide line. Further, the joint is configured to accommodate such expansions and contractions without degrading the effectively smooth continuous electrical surface presented to the signal being transmitted. The joint comprises relatively simple mechanical parts which can be readily assembled and coupled into the waveguide line. Further, because of the welded joints between the bellows and the telescoping tubes, joint 6 provides a pressure-tight seal which can support a pressure in the waveguide line either greater than or less than atmospheric pressure.

While the invention has been described with reference to specific embodiments thereof it is to be understood that various modifications thereto might be made without departing from its spirit and scope.

What is claimed is:

1. A flexible joint for joining two electrical transmission members to permit relative movement therebetween, comprising, in combination:
   a first tubular member;
   a second tubular member having a first end inserted in a telescoping relationship in a first end of said first member, said tubular members having flanges on the second ends thereof for connecting said joint to said transmission members; and
   a bellows mounted within said first tubular member in an initial condition and having a first end connected to said second end of said first tubular member and the second end connected to said first end of said second member to permit said telescoping relationship, said bellows having inner, outer and average radii that remain constant during expansion and contraction thereof from said initial condition whereby said joint presents an electrical surface having a constant radius to signals being transmitted therein.

2. Apparatus in accordance with claim 1 wherein said bellows includes inner and outer cylindrical sections concentric with the longitudinal center line of said bellows, and integral fins joining said inner and outer sections, said fins being responsive to said expansion and contraction from said initial condition to allow movement of said inner and outer sections with respect to each other along said center line while maintaining said section concentric with and at a constant distance from said center line whereby said inner, outer and average radii remain constant.

3. Apparatus in accordance with claim 2 wherein said bellows can be compressed a predetermined amount, and wherein said initial condition comprises a compression of said bellows of approximately 50 percent of said predetermined amount whereby said bellows remains in compression throughout said telescoping relationship.

4. Apparatus in accordance with claim 1 wherein said bellows has a plurality of convolutions therein CHARACTERIZED IN THAT:

$$[r/R < 0.01];$$
$$[r \approx p]; \text{ and}$$
$$[p \leq \lambda/4],$$

where
   $r$ is one-half the height of said convolutions;
   $R$ is the average distance of the inner surface of said bellows from the longitudinal center line of said bellows;
   $p$ is the spacing between said convolutions; and
   $\lambda$ is the wavelength of the highest frequency in said signals.

5. Apparatus in accordance with claim 1 wherein said bellows has a plurality of convolutions therein CHARACTERIZED IN THAT:

$$p \leq \lambda/4; \text{ and}$$
$$r >> p,$$

where $r$ is one-half the height of said convolutions;
   $p$ is the spacing between said convolutions; and
   $\lambda$ is the wavelength of the highest frequency in said signals.

6. Apparatus in accordance with claim 1 wherein said second member has a plurality of longitudinal grooves around the outer periphery of a portion thereof; and
   said first member has a plurality of splines mating with said grooves to prevent rotation of said members with respect to each other during said expansion and contraction.

7. Apparatus in accordance with claim 1 wherein said first member includes flanges around the inner surface thereof, said flanges being located to contact said second member when said second member has moved a prescribed amount with respect to said first member to prevent further movement thereby to limit said expansion and contraction to said prescribed amount.

8. Apparatus in accordance with claim 1 wherein said bellows is welded to said respective ends of said first and second members to form pressure-tight joints therewith whereby said joint provides a seal to maintain any desired pressure in the interior of said transmission members.

9. A flexible joint for joining two waveguide sections to permit relative movement therebetween comprising two tubular members connected by a flexible bellows, CHARACTERIZED IN THAT:
   a first one of said member is mounted in a telescoping relationship within the second one of said members; and
   said bellows is mounted about the inner surface of said second member and has respective ends thereof connected to respective ends of said members so that a smooth continuous electrical surface is presented by said joint to signals being transmitted therein, said bellows having dimensions so that the diameter of said electrical surface remains constant during expansion and contraction of said joint.

* * * * *